United States Patent

[11] 3,566,844

| [72] | Inventors | Alfred J. Occhiodori<br>Cincinnati, Ohio;<br>James A. Turton, Florence, Ky. |
|---|---|---|
| [21] | Appl. No. | 797,126 |
| [22] | Filed | Feb. 6, 1969 |
| [45] | Patented | Mar. 2, 1971 |
| [73] | Assignee | The Fieldstone Corporation<br>Cincinnati, Ohio |

[54] DRINKING VALVE FOR LAPPING ANIMALS
12 Claims, 3 Drawing Figs.

[52] U.S. Cl. .................................................. 119/72.5,
119/71
[51] Int. Cl. .................................................. A01k 7/00,
A01k 09/00
[50] Field of Search .......................................... 119/72.5,
75, 71

[56] References Cited
UNITED STATES PATENTS

| 2,678,630 | 5/1954 | Frederiksen.................. | 119/75 |
| 2,726,636 | 12/1955 | Frederiksen.................. | 119/72.5 |
| 3,215,119 | 11/1965 | Graham......................... | 119/75 |
| 3,228,377 | 1/1966 | Grassano...................... | 119/72.5 |
| 3,385,267 | 5/1968 | Boegli et al. ................. | 119/72.5 |
| 3,431,891 | 3/1969 | Boegli et al. ................. | 119/72.5 |

*Primary Examiner*—Aldrich F. Medbery
*Attorney*—J. Warren Kinney, Jr.

ABSTRACT: The drinking valve for lapping animals includes a lapping nozzle and a lapping ball operated by the tongue of an animal to release drinking water thereto from a source of supply. Elements of the valve subject to animal contact are quickly and easily replaceable without effort, and without spillage or leakage of water onto the floor of a cage or runway.

PATENTED MAR 2 1971

3,566,844

INVENTORS
ALFRED J. OCCHIODORI
JAMES A. TURTON

BY
J. Warren Kinney Jr.
ATTORNEY

DRINKING VALVE FOR LAPPING ANIMALS

The present invention relates to a drinking valve and is especially designed for use by lapping animals such as dogs and the like.

The drinking valve of the invention is intended to replace watering pans and other forms of water dispensers which are subject to leakage, spillage by the animals, contamination, and other faults common to watering equipment for use in runways, cages and other enclosures which should be kept dry and clean for the benefit of an animal's comfort and health.

An object of the invention is to provide an improved drinking valve for lapping animals, which is so constructed that an animal promptly learns to use it in obtaining drinking water, without spillage and wetting of the floor beneath the valve, and without danger of contamination by animal waste, food particles, and the like.

Another object of the invention is to provide a valve of the character stated, which is so constructed that parts thereof exposed to animal contact may quickly and easily be detached, cleaned, or replaced from time to time, as a health or sanitation measure, without waste or spillage of water.

Another object of the invention is to provide a valve or dispenser of the character stated, which is constructed to be foolproof, nonclogging, and serviceable throughout extended periods of time without the need for frequent servicing or maintenance attention.

A further object of the invention is to provide a valve of the character stated, which includes a lapping nozzle comprising a protective casing member or skirt which normally envelops and covers the entire coupling mechanism whereby certain valving parts are rendered easily detachable for cleaning, repair, or replacement.

The foregoing and other objects are attained by the means described herein and illustrated upon the accompanying drawing, in which.

Figure 1:
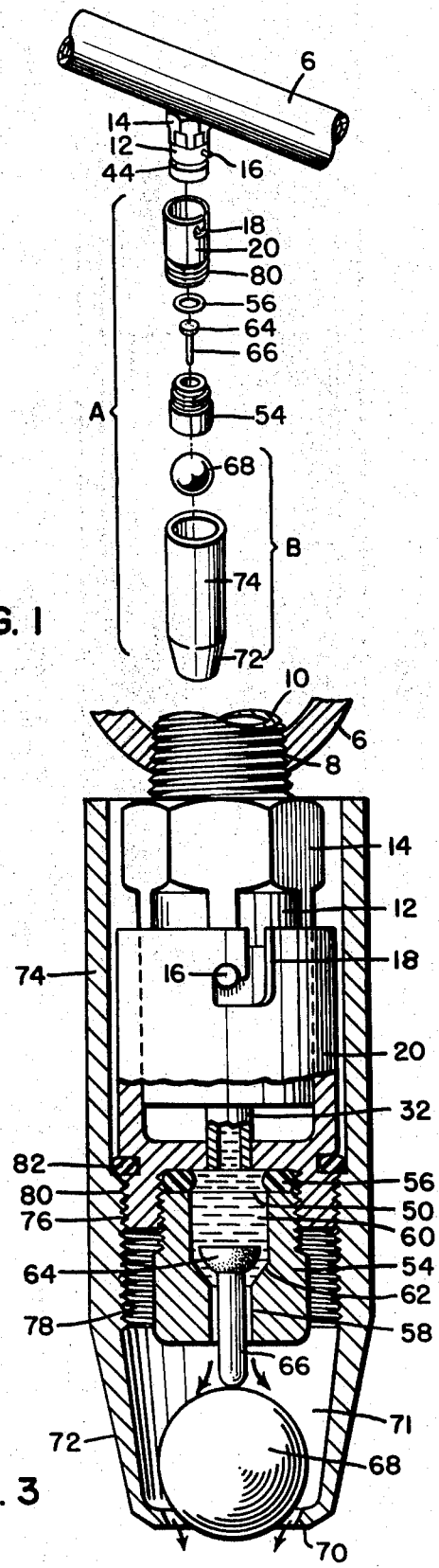
FIG. 1 is an exploded perspective view of the drinking valve of the present invention.
Figure 2:
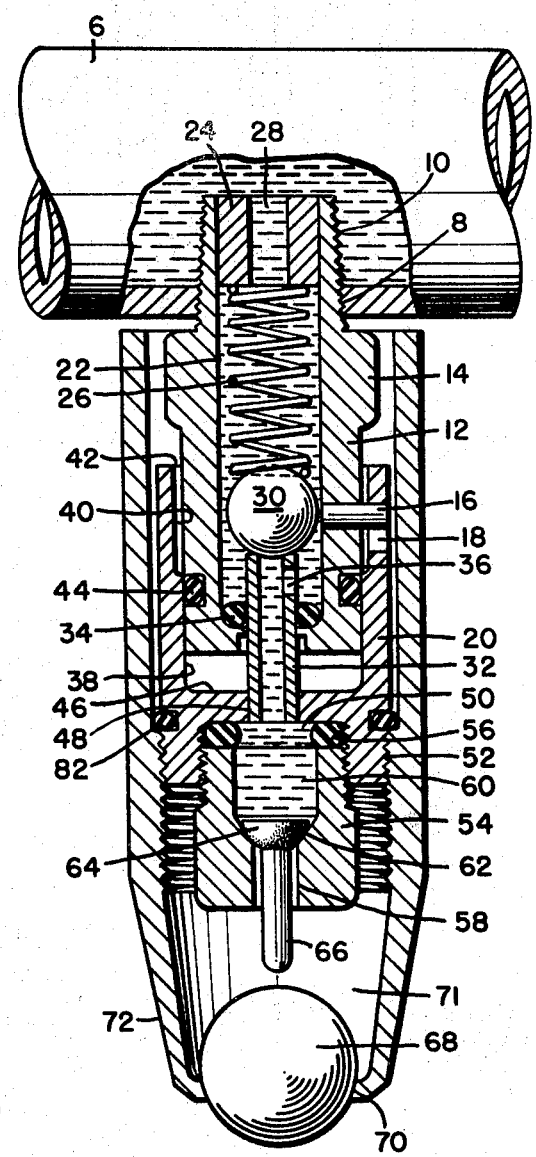
FIG. 2 is an enlarged vertical cross section of the valve in an assembled, nonoperating or shutoff condition.

In the drawing, the numeral 6 denotes a drinking water supply pipe or manifold, provided with one or more tapped holes 8 into which may be threaded the nipple end 10 of a fitting 12. Fitting 12 may properly be referred to as a normally fixed or stationary coupling member, having a wrench head 14 to facilitate application and removal of the coupling member relative to supply pipe 6.

Coupling member 12 carries one element 16 of a bayonet-type separable connector, the cooperative element thereof being an L-shaped slot 18 formed in the cylindrical wall of a second quick detachable coupling member 20, details of which will be revealed in due course. It may here be pointed out that the bayonet-type separable connector is disclosed herein by way of example only, and that other types of quick action separable connectors may be employed for detachably mounting the coupling member 20 upon its counterpart 12.

Coupling member 12 is provided with an elongate axial bore 22, the upper or intake end of which may be fitted with a bushing or equivalent seat member 24 for supporting one end of a compression spring 26. Bushing 24 has a fluid entry port 28 whereby fluid from the supply pipe 6 is conducted to bore 22.

Within bore 22 is a primary valve ball 30 which normally rests upon the upper end of a ball displacement tube 32, said tube serving normally to keep ball 30 separated from a main valve seat 34 at the lower end of bore 22. Tube 32 has a side opening 36 through which fluid may enter the tube from bore 22, so long as the tube is elevated above seat 34. Lowering of tube 32 below the level of seat 34 permits ball 30 to engage seat 34, thereby to preclude all flow of liquid downwardly through bore 22. The seat 34 may conveniently be a resilient O-ring supported on the bottom of bore 22.

As will be apparent, the spring 26 may not be needed so long as the valve is disposed in a depending position relative to supply pipe 6, wherein gravity or pressure of supply may act for closing the valve.

The detachable coupling member 20 may comprise a cylindrical sleevelike body having an upper smooth bore 38, and an upper counterbore 40 having a top opening 42. The bores 38 and 40 are slidingly receptive of the lower end portion of coupling member 12, which carries an O-ring seal 44 to abut the inner wall of bore 38. Coupling member 20 is equipped with the bayonet slot 18, which in conjunction with pin or element 16, holds the coupling members in an operative connected relationship according to FIG. 3. To disconnect the coupling members, for bodily removal of member 20, it is necessary only to impart a slight axial upward movement to member 20, and then rotate it counterclockwise a fractional turn, whereupon member 20 will be longitudinally displaceable downwardly from member 12, to divorce it from member 12.

At the inner end of bore 38, coupling member 20 is provided with a transverse wall 46 having a central bore 48 in which is anchored the lower end of tube 32. The tube is adapted to discharge liquid into a chamber 50 beneath wall 46, which chamber 50 is internally screw threaded at 52 to receive a removable plug 54. The inner end of plug 54 bears against an O-ring seal 56 located within chamber 50, to preclude leakage of liquid past the screw threads at 52.

Plug 54 is bored at 58 and counterbored at 60, to provide a valve seat 62 upon which normally rests a poppet valve 64 having a depending stem 66. The stem fits loosely within bore 58, to avoid all possibility of resistance to unseating of valve 64 by upward displacement of a lapping ball 68, which latter serves as an actuator for valve 64. Lapping ball 68 is of itself a valve, which normally rests upon a seat 70 at the lower end of nozzle reservoir 71.

Figure 3:
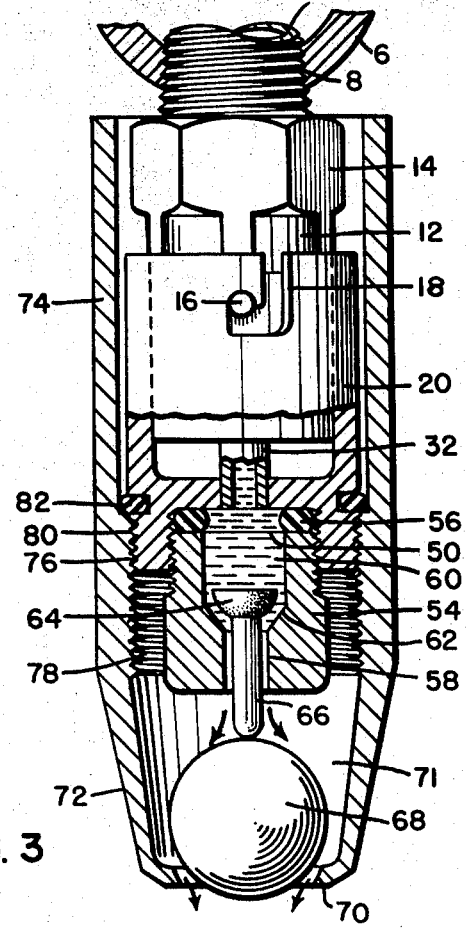
FIG. 3 is a view similar to FIG. 2 illustrating certain coupled parts in elevation, the valve being shown in operated condition for release of fluid.

The seat 70 is formed at the discharge end of the hollow lapping nozzle 72, from which a portion of ball 68 protrudes to a considerable extent. The lapping ball 68 preferably is quite large in diameter, and is so spaced from stem 66 that a slight upward or inward displacement of the lapping ball will unseat the poppet valve 64. Such unseating occurs whenever the tongue of an animal inwardly displaces ball 68 as the animal seeks drinking water. This condition is illustrated by FIG. 3, which shows by means of arrows the passage of drinking water from chamber 50 past the valving elements 64 and 68.

The lapping nozzle 72 includes a protective tubular sanitary casing portion or skirt 74, which by preference surrounds and envelops substantially the full length of the coupled members 20 and 12, with the possible exception of nipple 10. The skirt thereby covers and conceals the quick disconnect coupling at 16, 18 thereby ensuring that the coupling will never accumulate dirt, gum or any foreign matter tending to interfere with easy manipulation of the coupling.

Lapping nozzle 72 may be detachably secured about the coupling member 20 in any suitable manner, as by means of a screw-threaded connection at 76; that is, the part 72 may carry interior threads 78 engageable with the exterior threads 80 of member 20. An O-ring 82 or equivalent gasket means may be provided between the members 20 and 72, as shown.

It is important to note that partial disassembly of the valve may be effected in either of two ways, that is, by unscrewing the lapping nozzle from the coupling member 20 at the threads 76, as unit B of FIG. 1, thereby to leave intact the quick action connection at 16, 18; or, alternatively, the attendant may grasp the nozzle 72, slide it and member 20 slightly upwardly to unhook the bayonet connection at 16, 18, and then slightly rotate the nozzle and member 20 as a unit A of FIG. 1, to uncouple member 20 from member 12, leaving nozzle 72 attached to coupling member 20.

Under the procedure first mentioned above, the lapping ball 68 and lapping nozzle 72 will be removed, leaving exposed the valve stem 66. By manipulating the valve stem 66, the entire valve may be purged to clear it of any sediment or foreign matter. Under the alternative procedure above mentioned, tube 32 will be lowered through O-ring or valve seat 34, thereby permitting ball 30 to seat immediately upon seat 34, to automatically block any escape of water downwardly from the bore 22 of coupling member 12. Under either of the procedures mentioned, there can be no inadvertent escape of water resulting from removal of the valve parts, to dampen or flood the floor of a cage or runway in which the valve may be situated.

It is noted that side opening 36 of tube 32 is spaced from the upper end of the tube, so that when tube 32 is lowered, the side opening will be closed by O-ring 34 just prior to seating of valve ball 30 upon said O-ring. The upper end of tube 32 may be either open as shown, or closed, for support of the valve ball 30.

In the interests of sanitation and trouble-free performance, the major constituents of the valve may be constructed of stainless steel or other acceptable corrosion and wear resistant materials. Any number of such valves may be connected to supply pipe or manifold 6, in the manner disclosed. If considered necessary or desirable, replacement of nozzles may be effected daily or at other intervals of time, with great ease and dispatch and without wetting or flooding the floor area beneath the drinking apparatus.

We claim:

1. A drinking valve for lapping animals, comprising in combination: a normally stationary elongate first coupling member bored from end to end, and means for connecting one end of the bore to a source of drinking water; a main valve seat near the other end of said bore; a primary valve member within said bore adapted for movement to seated and unseated positions relative to said main valve seat; a quick detachable second coupling member in the form of a sleeve longitudinally slidable relative to said first coupling member, from an advanced connected position, to a retracted inoperative position of complete separation relative to said first coupling member; means associated with said second coupling member providing a water chamber having a discharge port; a second movable valve normally closing said discharge port; a primary valve member displacing means carried by the second coupling member and providing fluid communication between said water chamber and the bore of said first coupling member, said valve displacing means projectable into the bore of the first coupling member past the main valve seat thereof for holding the primary valve member off of said main valve seat whenever the second coupling member is disposed to the advanced position aforesaid; said valve displacing means being retractable from said first coupling member bore to release the primary valve member for closing upon the main valve seat whenever said second coupling member is retracted to the inoperative position aforesaid; a hollow sanitary nozzle member connected to one of said coupling members and being readily removable therefrom independently of movement of said coupling members, said hollow nozzle member depending from the second coupling member and being in the form of a sleeve having a protective skirt surrounding and covering the second coupling member and the major portion of the length of the first coupling member; and means movable relative to said nozzle member in response to contact with the tongue of an animal seeking water, for unseating said second movable valve to release water from the discharge port of the aforesaid water chamber into the hollow interior of said nozzle member.

2. The valve as defined by claim 1, wherein said sleeve has an open terminal end portion subject to lapping by an animal; a valve seat at said terminal end portion; a displaceable lapping valve normally resting upon said terminal seat with a portion of said lapping valve exposed for contact with and displacement by the tongue of an animal; and means translating movements of said lapping valve from its said terminal seat, to said second valve, as and for the purpose stated.

3. The valve as defined by claim 1, wherein the detachable connection for the sleeve involves only said second coupling member.

4. The valve as defined by claim 1, wherein the aforesaid quick detachable disconnect between the first and second coupling members, includes a bayonet-type connection.

5. The valve as defined by claim 1, wherein said sleeve is detachably connected to said second coupling member, said sleeve having an open terminal end portion carrying a valve seat; a displaceable lapping valve normally resting upon said terminal valve seat, with a portion of said lapping valve exposed for contact with and displacement from said terminal valve seat; and means operative incident to displacement of said lapping valve, for unseating said second valve, as and for the purpose stated.

6. The valve as defined by claim 5, wherein the displaceable lapping valve is in the form of a ball.

7. The valve as defined by claim 6, wherein the aforesaid quick detachable disconnect between the first and second coupling members, includes a bayonet-type connection or equivalent connection.

8. The valve as defined by claim 6, wherein said second movable valve is in the form of a poppet valve, and said means for unseating said second valve includes a stem integral therewith and having a free end normally slightly spaced from said lapping valve when the latter is seated.

9. The valve as defined by claim 8, wherein the aforesaid quick detachable disconnect between the first and second coupling members, includes a bayonet-type connection.

10. In a water dispenser for lapping animals, the combination of an elongate substantially cylindrical water valve including an inlet end and an outlet end, a valve seat intermediate said ends and a valving member including a valve stem having an end which projects outwardly from the outlet end of said valve, an elongate, substantially cylindrical sanitary lapping nozzle readily removably secured to, carried by and enclosing said water valve for protecting said water valve against contamination, said nozzle being removable from said water valve independently of movement of said water valve and terminating in a valve seat spaced from the outlet end of said water valve, and a spherical member loosely seated on the valve seat of said nozzle closely adjacent but spaced from the end of said valve stem with a portion of said member projecting from the lower end of the nozzle, whereby said valving member is unseated upon inward movement of the spherical member into engagement with said valve stem by an animal licking the projecting portion of said spherical member.

11. The water dispenser as defined in claim 10, wherein the cylindrical water valve is externally threaded and wherein the lapping nozzle is internally threaded for releasably securing said nozzle to said valve.

12. The water dispenser as defined in claim 10, wherein means are provided for connecting said water valve to a source of water supply.